United States Patent [19]
Abe

[11] Patent Number: 6,052,509
[45] Date of Patent: *Apr. 18, 2000

[54] IMAGE PICKUP APPARATUS

[75] Inventor: Takeshi Abe, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/819,374

[22] Filed: Mar. 17, 1997

[30] Foreign Application Priority Data

Mar. 22, 1996 [JP] Japan ..................... 8-066359

[51] Int. Cl.⁷ ............... H04N 5/225; H04N 5/91
[52] U.S. Cl. ......................... 386/117; 386/107
[58] Field of Search ................. 386/117, 107, 386/46, 118, 38; 348/211, 222, 723, 722, 705, 724, 212; 358/906; H04N 5/225, 5/91

[56] References Cited

U.S. PATENT DOCUMENTS 5,477,264  12/1995  Sarbadhikari et al. ............ 348/231
5,666,159  9/1997  Parulski et al. .................... 348/211

*Primary Examiner*—Robert Chevalier
*Attorney, Agent, or Firm*—Robin, Blecker & Daley

[57] ABSTRACT

While a camera portion and a body portion having a display portion or a recording portion are separated from each other, a signal can be bidirectionally communicated between them by wireless communication circuits which are respectively provided in the camera portion and the body portion. A camera control circuit included in the camera portion transmits, to the body portion by wireless communication, information concerning a remaining amount of energy of a battery of the camera portion or information concerning a photographing state of the camera portion. The body portion displays, on a screen of an image display portion, a variety of information signals received by wireless communication, in such a manner as to be superimposed on an image photographed by the camera portion.

35 Claims, 9 Drawing Sheets

IMAGE PICKUP APPARATUS

FIELD OF THE INVENTION

The present invention relates to an image pickup apparatus, and, more particularly, to an image pickup apparatus in which a camera portion for photographing (shooting) an object is separated from a display portion for displaying a picked-up (photographed) image obtained by the camera portion or a recording portion for recording a picked-up image obtained by the camera portion.

DESCRIPTION OF RELATED ART

FIG. 8 shows a schematic block diagram showing the arrangement of a conventional image pickup apparatus such as a camera-integrated type video tape recorder (VTR). In the camera-integrated type video tape recorder, an image pickup portion 210 converts an optical image of an object into an electrical signal, and an A/D converter 212 converts an analog output of the image pickup portion 210 into a digital signal. A camera signal processing circuit 214 applies various processing to an image data outputted from the A/D converter 212 and outputs the processed image data to a D/A converter 216. The D/A converter 216 converts the output of the camera signal processing circuit 214 back to an analog signal and supplies the analog signal to an image display portion 218, such as an electronic viewfinder or a liquid crystal panel. The image display portion 218 thus displays an image picked up by the image pickup portion 210.

The output of the D/A converter 216 is supplied also to a recording signal processing circuit 220. In a recording mode of the apparatus, the recording signal processing circuit 220 processes an image signal outputted from the D/A converter 216 and causes the processed image signal to be recorded on a recording medium (magnetic tape, magnetic disk, magneto-optical disk, optical disk or the like) 224 by using an electromagnetic transducing portion (for example, magnetic head) 222. The recording mode mentioned herein means a state in which an image being picked up by the image pickup portion 210 is being recorded on the recording medium 224 or a state in which the recording action is in pause.

A camera control circuit 226 composed of a microcomputer, in accordance with an operation of a camera operation key 228, controls the processing action of the camera signal processing circuit 214 and controls a digital special effect circuit 230 to apply a variety of special effects to the picked-up image.

In accordance with operations of a VTR operation key 234 and a power supply switch 236 which is arranged to control the supply of electric power to a VTR portion and a camera portion of the image pickup apparatus shown in FIG. 8, a VTR control circuit 232 controls the VTR portion and opportunely informs the camera control circuit 226 of the operating status of the power supply switch 236. The VTR control circuit 232 is also composed of a microcomputer. A mechanism portion control circuit 238 controls a VTR mechanism portion 240 to appositely drive the recording medium 224. The mechanism portion control circuit 238 is also composed of a microcomputer and is arranged to communicate with the VTR control circuit 232.

In the conventional apparatus as described above referring to FIG. 8, a camera portion and a body portion (a display portion and a recording portion) are integrated into one unit, so that the positional relation between the display portion or the recording portion and the camera portion is fixed. Therefore, the conventional apparatus has such a drawback that it is difficult or impossible to perform a shooting at a cramped place or at a high or low angle, or a shooting range or shooting object is limited.

FIG. 9 is a schematic block diagram showing the arrangement of a conventional image pickup apparatus, in which a camera portion 310 for converting an optical image into a video signal of a predetermined format and a body portion (a display portion and a recording portion) 340 for displaying an image picked up by the camera portion 310 and recording the picked-up image on a recording medium 360 in accordance with an instruction of the operator are formed as separate units and the two units are coupled by wireless communication.

The camera portion 310 is configured as follows. An image pickup portion 312 converts an optical image of an object into an electrical signal, and an A/D converter 314 converts an analog signal outputted from the image pickup portion 312 into a digital signal. A camera signal processing circuit 316 applies camera signal processing to image data outputted from the A/D converter 314. Data outputted from the camera signal processing circuit 316 is modulated by a modulation circuit 318 and is then wireless-transmitted toward an antenna 342 of the body portion 340 from an antenna 322 by a wireless signal transmitting circuit 320.

A camera control circuit 326 composed of a microcomputer controls the camera signal processing circuit 316 and the wireless transmitting circuit 320 in accordance with operations of a camera portion operation key 328 and a camera portion power supply switch 330. The camera control circuit 326 reads the operating status of the camera portion operation key 328 and, if that operating status is such information as to be required to be transferred to the body portion 340, outputs the information to the wireless signal transmitting circuit 320. The wireless signal transmitting circuit 320 multiplexes control information from the camera control circuit 326 on image information from the modulation circuit 318 and transmits the multiplexed information to the body portion 340 from the antenna 322.

Incidentally, a camera battery 332 is arranged to supply electric power to each part of the camera portion 310.

In the body portion 340, a wireless signal from the antenna 322 of the camera portion 310 is received at the antenna 342 and is then inputted to a wireless signal receiving circuit 344. The wireless signal receiving circuit 344 supplies, among the received information, the image information to a demodulation circuit 346 and the control information to a body control circuit 362. The demodulation circuit 346 demodulates the received image information. The output of the demodulation circuit 346 corresponds to the output of the camera signal processing circuit 316 of the camera portion 310. A D/A converter 348 converts data outputted from the demodulation circuit 346 back to an analog signal and supplies the analog signal to an image display portion 354, such as an electronic viewfinder or a liquid crystal display panel. The image display portion 354 thus displays an image picked up by the image pickup portion 312.

The output of the D/A converter 348 is supplied also to a recording signal processing circuit 356. In a recording mode of the apparatus, the recording signal processing circuit 356 processes an image signal outputted from the D/A converter 348 and causes the processed image signal to be recorded on a recording medium (magnetic tape, magnetic disk, magneto-optical disk, optical disk or the like) 360 by using an electromagnetic transducing portion (for example, magnetic head) 358. The recording mode mentioned herein means a state in which an image being picked up by the image pickup portion 312 is being recorded on the recording medium 360 or a state in which the recording action is in pause.

The body control circuit 362, which is composed of a microcomputer, controls a recording portion of the body portion 340 through a VTR control circuit 370 in accordance with operations of a body portion operation key 364 and a power supply switch 366 and a control signal sent from the camera portion 310. The body control circuit 362 is arranged to always communicate with the VTR control circuit 370. The VTR control circuit 370 controls a VTR mechanism portion 372, if necessary, to drive the recording medium 360.

Incidentally, a body battery 374 is arranged to supply electric power to each part of the body portion 340.

The conventional apparatus shown in FIG. 9 corresponds to the arrangement in which the camera signal processing circuit 214 and the D/A converter 216 of the conventional apparatus shown in FIG. 8 are connected by a wireless signal path and the wireless signal path is utilized also for transmitting a control signal from the camera control circuit 226 to the VTR control circuit 232.

AS described above, in a separate type image pickup apparatus such as that shown in FIG. 9, since there is no limitation to the positional relationship between the camera portion 310 and the body portion (display portion and recording portion) 340, photographing at a cramped place or photographing at a high or low angle becomes easy, so that there is no limitation to a photographing range or a photographing object. However, since the conventional separate type image pickup apparatus is not capable of causing information about the camera portion 310, which is a unit separate from the body portion 340, to be displayed at the body portion 340, the operator cannot confirm the operating status of the camera portion 310 on the spot, so that the operability of the apparatus would be low. Further, in such an image pickup apparatus, the camera portion 310 and the body portion 340, which are separate units, must be provided with the batteries 332 and 374, respectively. However, the consumption of the battery 332 in the camera portion 310 can not be confirmed on the side of the body portion 340. Therefore, there would arise such a situation that photographing unexpectedly becomes impossible due to the consumption of the camera battery 332.

BRIEF SUMMARY OF THE INVENTION

An object of the present invention is to solve the above-described problems.

Another object of the present invention is to provide an image pickup apparatus in which the status of a camera portion can be readily confirmed on the side of a display portion or a recording portion which is separated from the camera portion.

Under these objects, an image pickup apparatus according to a preferred embodiment of the present invention comprises a camera portion, and a display portion or a recording portion which is a unit separate from the camera portion, wherein information concerning the camera portion is transmitted to the display portion or the recording portion by wireless communication by using transmitting and receiving means provided in each of the camera portion and the display portion or the recording portion.

Still other objects of the present invention, and the advantages thereof, will become fully apparent from the following detailed description of the preferred embodiments thereof taken in conjunction with the accompanying the drawings.

DETAILED DESCRIPTION OF THE INVENTION

The preferred embodiments of the present invention will be described in detail hereinafter with reference to the accompanying drawings.

Figure 1:
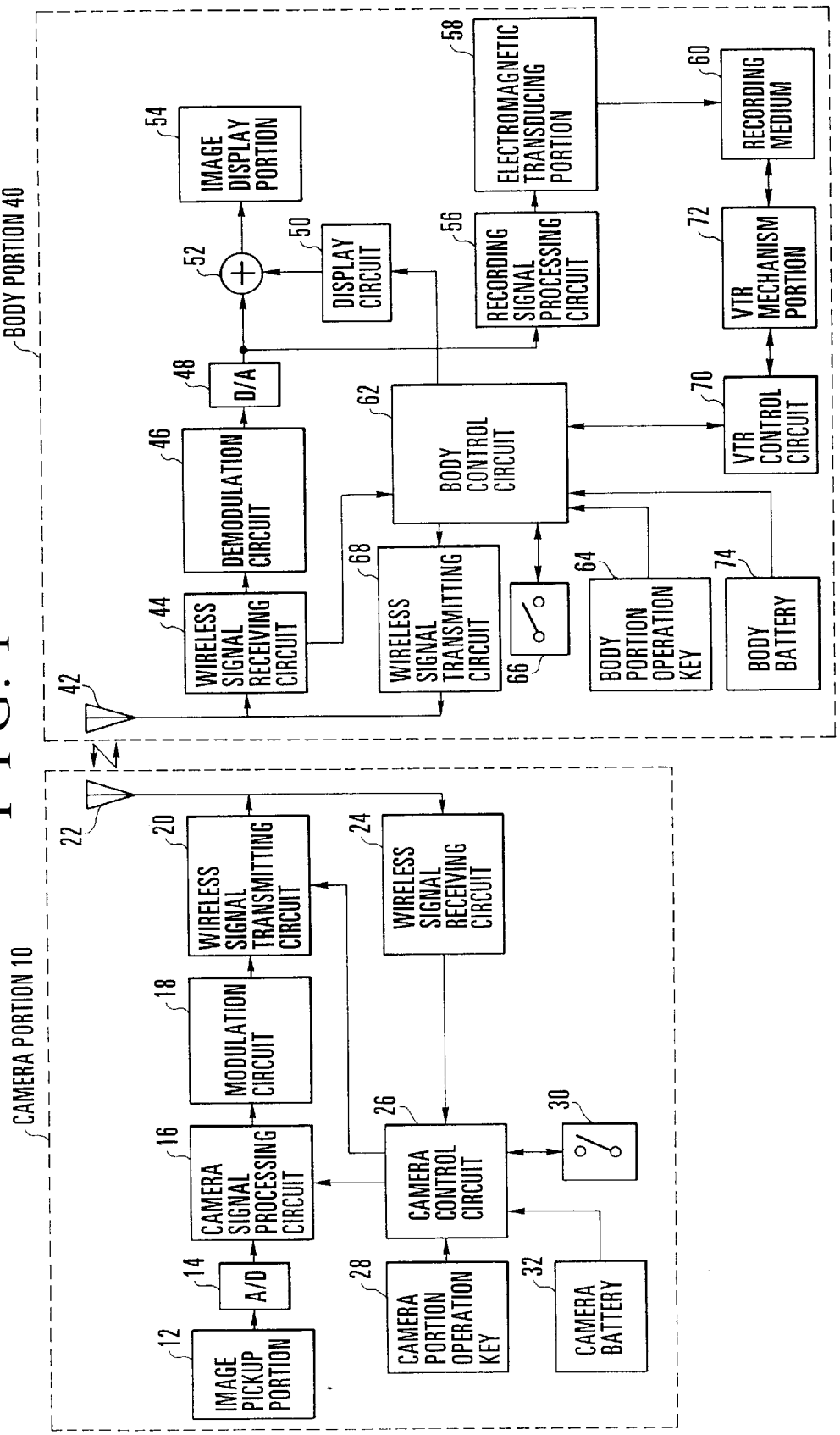
FIG. 1 is a schematic block diagram showing the arrangement of a first embodiment of the present invention.
Figure 9:
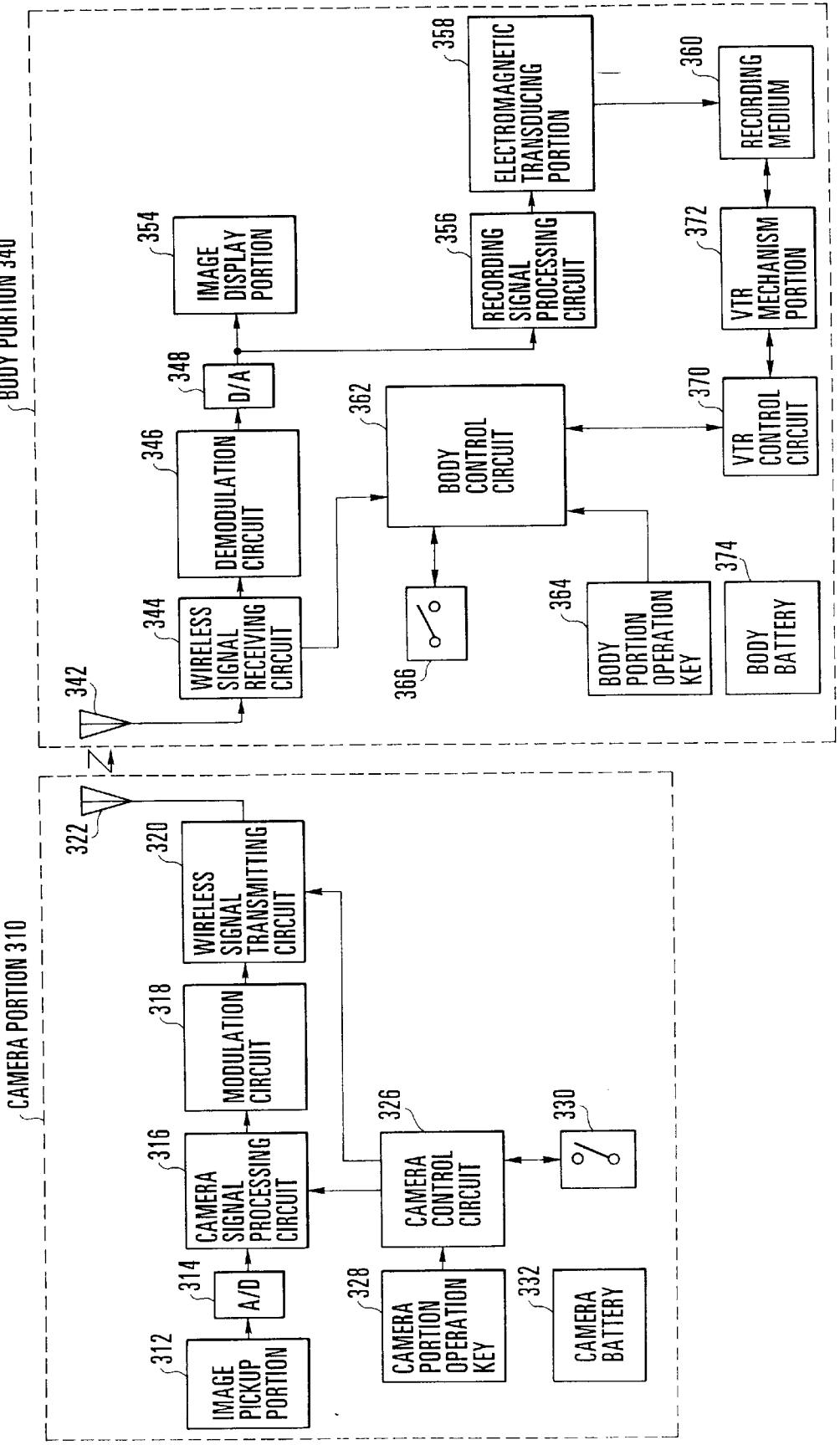
FIG. 9 is a schematic block diagram showing the arrangement of a conventional separate type image pickup apparatus.

FIG. 1 is a schematic block diagram showing the arrangement of a first embodiment of the present invention. Referring to FIG. 1, a camera portion 10 converts an optical image into a video signal of a predetermined format, and a body portion (a display portion and a recording portion) 40 displays an image picked up by the camera portion 10 and records, in accordance with an instruction of the operator, the picked-up image on a recording medium 60. The camera portion 10 and the body portion 40 are coupled by wireless communication. As being different from the conventional apparatus shown in FIG. 9, in the first embodiment, the body portion 40 can wireless-transmit a variety of data (for example, a control command for controlling the operation of the camera portion 10, etc.) to the camera portion 10, and the camera portion 10 can wireless-transmit to the body portion 40 information indicative of the consumption of battery energy of the camera portion 10. The body portion 40 displays the information received from the camera portion 10 and the wireless-transmitted information indicative of the control command, etc., in such a state as to be superimposed on a displayed video image.

The camera portion 10 is configured as follows. An image pickup portion 12 converts an optical image of an object into an electrical signal, and an A/D converter 14 converts an analog signal outputted from the image pickup portion 12 into a digital signal. A camera signal processing circuit 16 applies camera signal processing to image data outputted from the A/D converter 14. Data outputted from the camera signal processing circuit 16 is modulated by a modulation circuit 18 and is then wireless-transmitted toward an antenna 42 of the body portion 40 from an antenna 22 by a wireless signal transmitting circuit 20.

A camera control circuit 26 composed of a microcomputer controls the camera signal processing circuit 16 and the wireless transmitting circuit 20 in accordance with operations of a camera portion operation key 28 and a camera portion power supply switch 30. The camera control circuit 26 reads the operating status of the camera portion operation key 28 and, if that operating status is such information as to be required to be transferred to the body portion 40, outputs the information to the wireless signal transmitting circuit 20. The wireless signal transmitting circuit 20 multiplexes control information from the camera control circuit 26 on image information from the modulation circuit 18 and transmits the multiplexed information to the body portion 40 from the antenna 22.

Further, the camera control circuit 26 always monitors an output voltage of a camera battery 32 arranged to supply electric power to each part of the camera portion 10, and transmits a remaining amount of energy of the camera battery 32 in response to the request of the body portion 40 or at periodic intervals or at opportune timing.

In the first embodiment, the control information, etc., wireless-transmitted from the body portion 40 to the camera portion 10 are supplied from the antenna 22 to a wireless signal receiving circuit 24. The wireless signal receiving circuit 24 outputs such received information to the camera control circuit 26, and the camera control circuit 26 performs a processing action according to the received information. Accordingly, a zooming operation, a shooting direction, an exposure, a focusing operation, etc., can be remotely controlled from on the side of the body portion 40.

The body portion 40 is configured as follows. In the body portion 40, a wireless signal from the antenna 22 of the camera portion 10 is received at the antenna 42 and is then inputted to a wireless signal receiving circuit 44. The wireless signal receiving circuit 44 supplies, among the received information, the image information to a demodulation circuit 46 and the control information to a body control circuit 62. The demodulation circuit 46 demodulates the received image information. The output of the demodulation circuit 46 corresponds to the output of the camera signal processing circuit 16 of the camera portion 10. A D/A converter 48 converts data outputted from the demodulation circuit 46 back to an analog signal. A display circuit 50 generates a character or image signal corresponding to the contents of the control signal inputted to the body control circuit 62 from the camera portion 10. An adder 52 multiplexes an output of the display circuit 50 with an output of the D/A converter 48. An output of the adder 52 is supplied to an image display portion 54, such as an electronic viewfinder or a liquid crystal display panel, and is displayed there as an image.

Owing to the display circuit 50 and the adder 52, arbitrary information, such as information on a remaining amount of energy of the camera battery 32, in the first embodiment, can be displayed on a screen of the image display portion 54.

The output of the D/A converter 48 is supplied also to a recording signal processing circuit 56. In a recording mode of the apparatus, the recording signal processing circuit 56 processes an image signal outputted from the D/A converter 48 and causes the processed image signal to be recorded on a recording medium (magnetic tape, magnetic disk, magneto-optical disk, optical disk or the like) 60 by using an electromagnetic transducing portion (for example, magnetic head) 58. Incidentally, the recording medium 60 may be a non-volatile solid-state memory element such as a flash memory. The recording mode mentioned herein means a state in which an image being picked up by the image pickup portion 12 is being recorded on the recording medium 60 or a state in which the recording action is in pause.

The body control circuit 62, which is composed of a microcomputer, controls a recording portion of the body portion 40 through a VTR control circuit 70 in accordance with operations of a body portion operation key 64 and a power supply switch 66 and a control signal sent from the camera portion 10. The body control circuit 62 is arranged to always communicate with the VTR control circuit 70. The VTR control circuit 70 controls a VTR mechanism portion 72, if necessary, to drive the recording medium 60.

In the first embodiment, there is provided a wireless signal transmitting circuit 68 for transmitting from the body portion 40 to the camera portion 10 control information (control commands for controlling a zooming operation, a focusing operation, an exposure, a shooting direction, etc., of the camera portion 10, or control commands for turning on or off the camera portion 10, etc.). Thus, the body portion control circuit 62 can transmit predetermined control information to the camera portion 10 via the wireless signal transmitting circuit 68 and the antenna 42. In this instance, the display circuit 50 generates a character or image signal corresponding to the contents of the control information wireless-transmitted to the camera portion 10, so that the image display portion 54 can display an output signal of the display circuit 50 in such a state as to be superimposed on an image signal obtained by the camera portion 10.

A body battery 74 is arranged to supply electric power to each part of the body portion 40. An output voltage of the body battery 74 is supplied to the body control circuit 62 so as to detect a remaining amount of energy of the body battery 74. The body control circuit 62 always or periodically monitors the output voltage of the body battery 74, and controls and causes the display circuit 50 to display the remaining amount of energy of the body battery 74 on the screen of the image display portion 54, in response to an instruction of the operator.

As described above, according to the first embodiment, a zooming operation, a shooting direction, an exposure, a focusing operation, etc., of the camera portion 10 can be remotely controlled from on the side of the body portion 40. Further, the state of the camera portion 10 can be recognized on the side of the body portion 40. The body portion 40 can desirably display the state of the camera portion 10, particularly, the consumption of the camera battery 32, on the screen of the image display portion 54 by using the display circuit 50, and further can give warning to the operator when the consumption of the camera battery 32 has come into a predetermined state.

Figure 2:
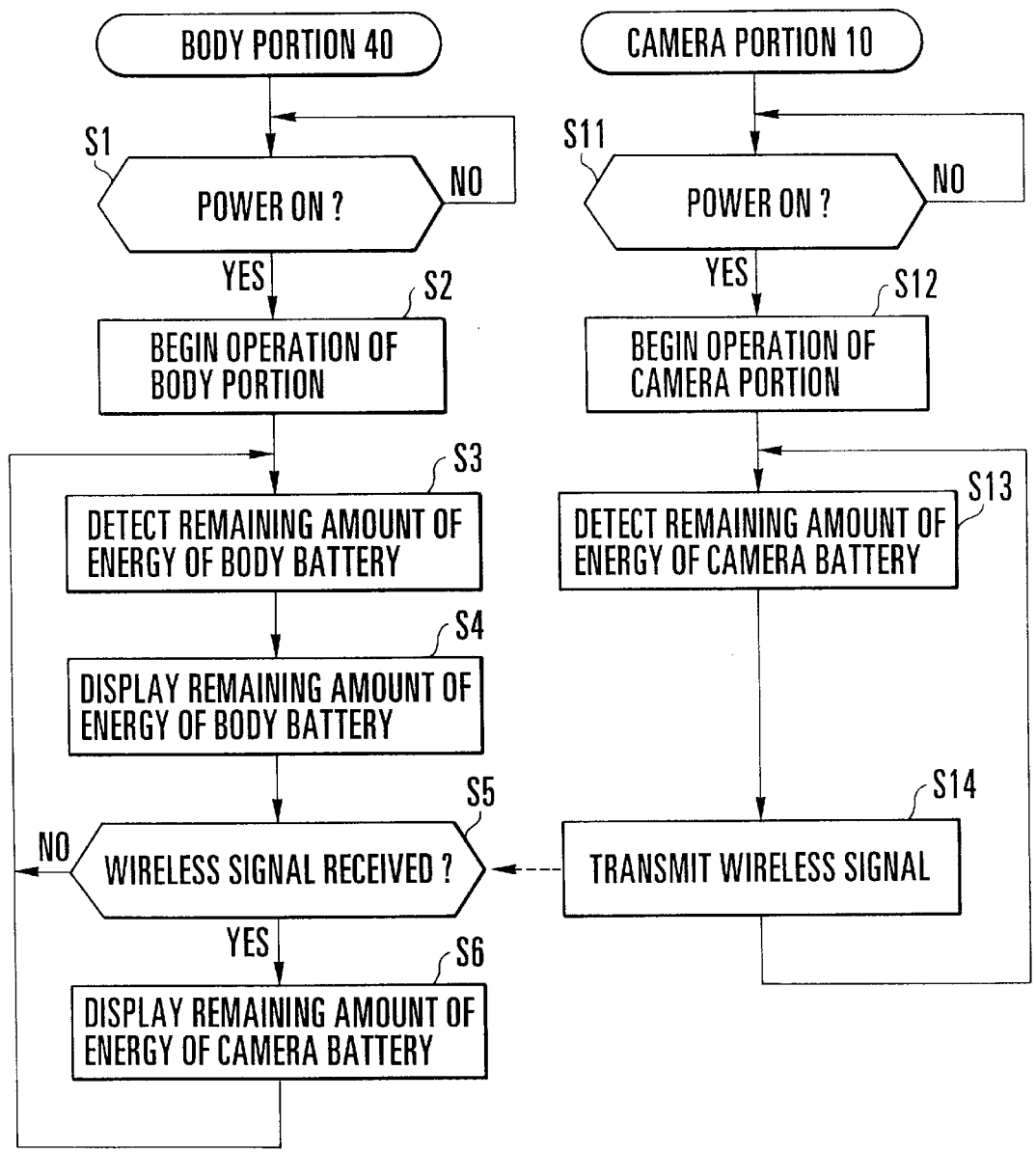
FIG. 2 is a flow chart showing an action related to displaying of a remaining amount of battery energy in the first embodiment shown in FIG. 1.

FIG. 2 is a flow chart showing an operation of the first embodiment concerning the displaying of a remaining amount of energy of the camera battery 32. When the power supply switch 66 is turned on (step S1), the body portion 40 begins to operate (step S2). The body control circuit 62 detects an output voltage of the body battery 74 (step S3), and causes the display circuit 50 to display information on the remaining amount of energy of the body battery 74 on the screen of the image display portion 54 (step S4).

On the side of the camera portion 10, when the power supply switch 30 is turned on (step S11), electric power is supplied to each part of the camera portion 10, so that the camera portion 10 begins to operate (step S12). The camera control circuit 26 detects an output voltage of the camera battery 32 (step S13) and transmits information on the remaining amount of energy of the camera battery 32 to the body portion 40 via the wireless signal transmitting circuit 20 and the antenna 22 (step S14). The body portion 40, when receiving from the camera portion 10 the information on the remaining amount of energy of the camera battery 32 (step S5), causes the information on the remaining amount of energy of the camera battery 32 to be displayed on the screen of the image display portion 54 by using the display circuit 50 (step S6).

In the first embodiment, the remaining amount of energy of each of the camera battery 32 and the body battery 74 is examined at intervals of a relatively long period when it is sufficiently large, and is examined at intervals of a shorter period as it becomes smaller. Immediately before the energy of the camera battery 32 has been consumed, the camera portion 10 informs the body portion 40 of the information on the remaining amount of energy of the camera battery 32 at intervals of a very short period. Further, in this instance, the body portion 40 may be arranged to give to the operator a warning indicating that the remaining amount of energy of the camera battery 32 is on the point of being used up.

Figure 3:
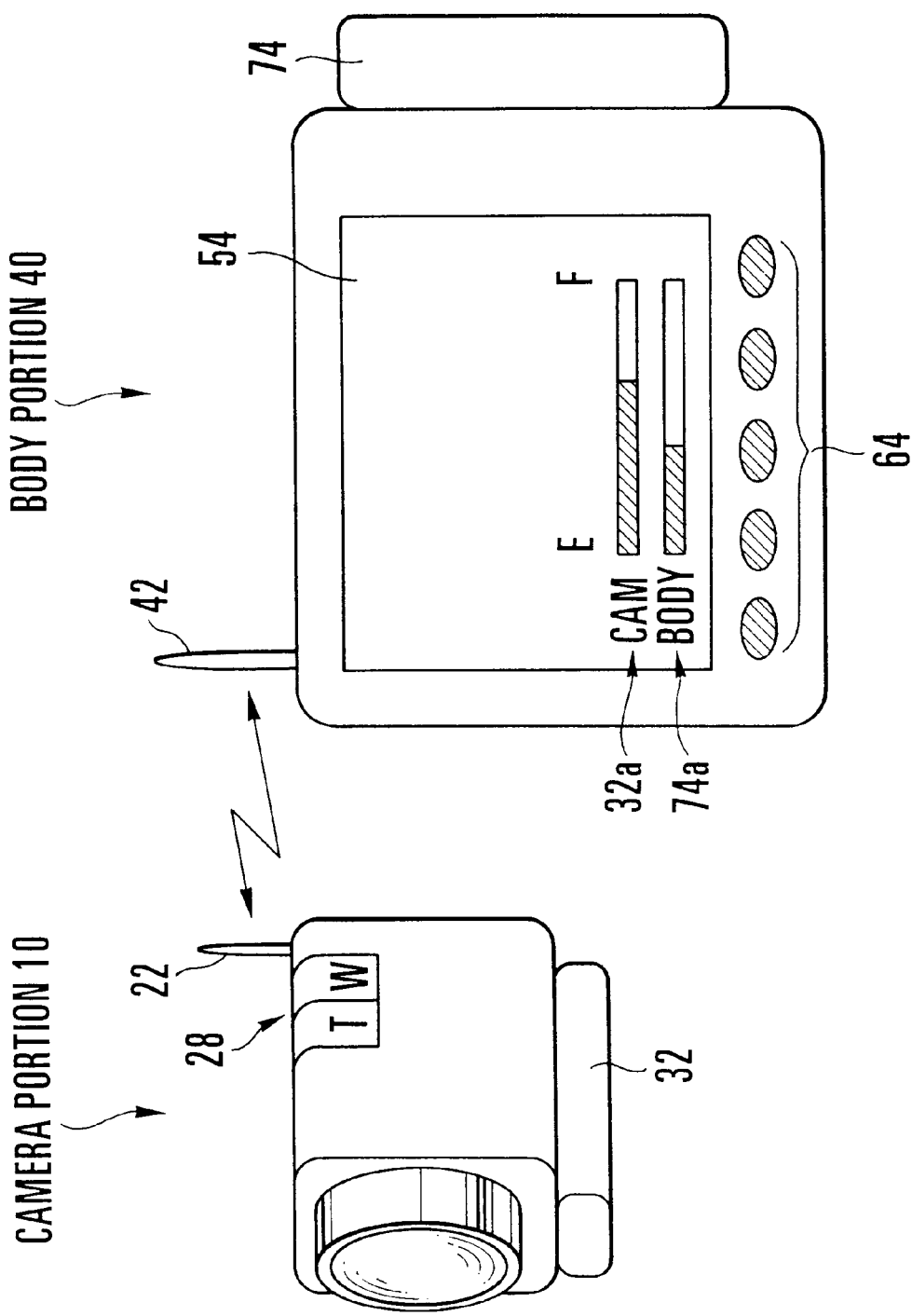
FIG. 3 illustrates an outer appearance of the first embodiment shown in FIG. 1 as well as a display screen thereof.

FIG. 3 illustrates the outer appearance of the first embodiment. In FIG. 3, the same constituent elements as those shown in FIG. 1 are denoted by the respective same reference numerals. On the screen of the image display portion 54, there are displayed a bar graph 32a indicative of the remaining amount of energy of the camera battery 32 and a bar graph 74a indicative of the remaining amount of energy of the body battery 74 in such a state as to be superimposed on the picked-up image. As each of the bar graphs 32a and 74a becomes nearer to a mark "F", it is indicated that the remaining amount of battery energy is larger, and as each of the bar graphs 32a and 74a becomes nearer to a mark "E", it is indicated that the remaining amount of battery energy is smaller. Incidentally, the camera battery 32 of the camera portion 10 and the body battery 74 of the body portion 40 are attached to an outer side of the camera portion 10 and an outer side of the body portion 40, respectively.

Figure 4:
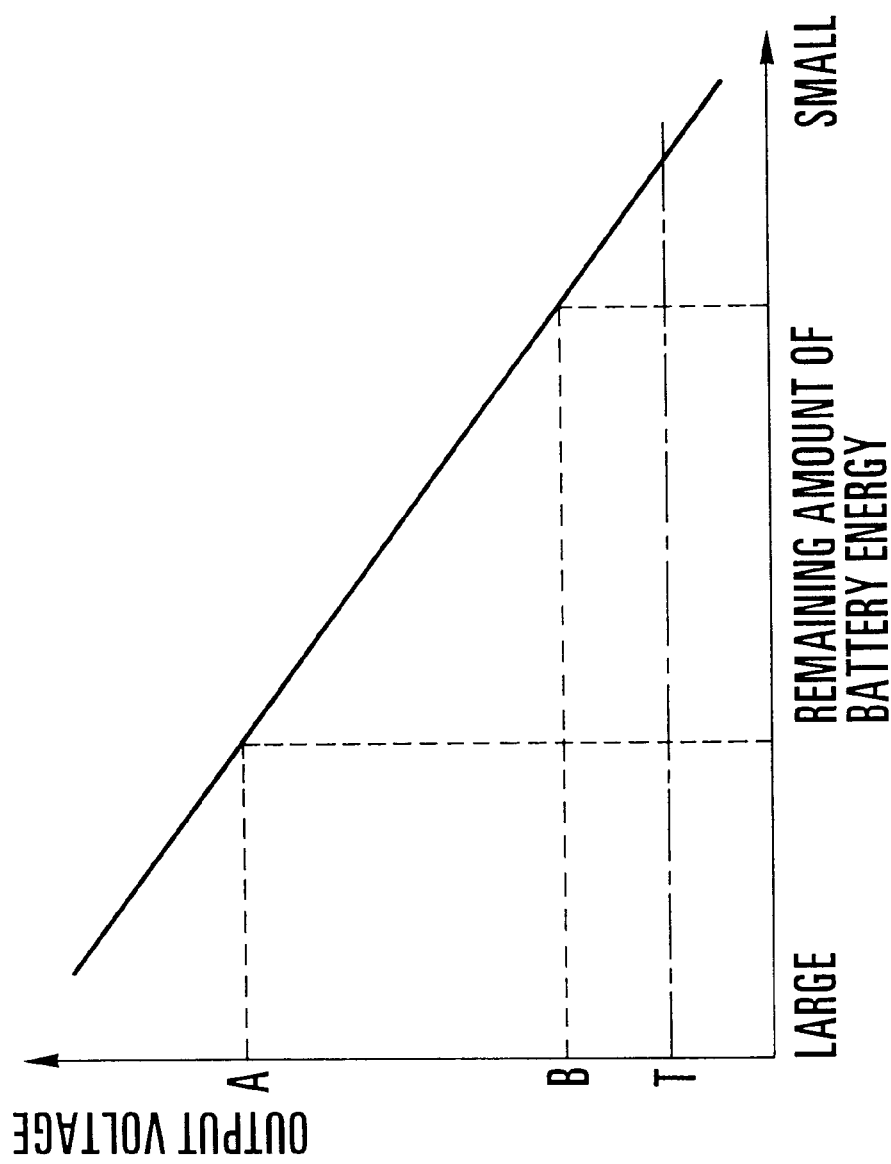
FIG. 4 is a characteristic diagram showing the relationship between an output voltage of the battery and a remaining amount of energy of the battery.

FIG. 4 is a diagram showing the general relationship between the output voltage of each of the batteries 32 and 74 and the remaining amount of battery energy . In FIG. 4, the abscissa axis indicates the output voltage of the battery, and the ordinate axis indicates the remaining amount of battery energy. Generally, as the output voltage of each of the batteries 32 and 74 is higher, the remaining amount of battery energy is larger. For example, a lithium ion battery has a characteristic similar to that shown in FIG. 4. A value T of the output voltage of the battery indicates a threshold voltage required to operate the camera portion 10 or the body portion 40 shown in FIG. 1. For example, when the detected output voltage of the battery has a value A, the remaining amount of battery energy is considered sufficient, while when the detected output voltage of the battery has a value B, the remaining amount of battery energy is considered little. Further, when the detected output voltage of the battery has a value lower than the value T, the remaining amount of battery energy is considered substantially zero.

As described above, according to the first embodiment, since there is no limitation to the positional relationship between the body portion 40 and the camera portion 10, photographing at a cramped place or photographing at a high or low angle becomes easy, so that there is no limitation to a photographing range or a photographing object. Further, since information on a remaining amount of battery energy of the camera portion 10, which is separated from the body portion 40, is wireless-transmitted to the body portion 40 and the remaining amount of battery energy of the camera portion 10 can be confirmed on the side of the body portion 40, it is possible to prevent in advance such a situation that photographing suddenly becomes impossible due to the consumption of the battery of the camera portion 10. Further, besides the remaining amount of battery energy of the camera portion 10, a variety of pieces of information about the camera portion 10 are wireless-transmitted to the body portion 40 and are displayed on the screen of the image display portion 54, so that the state of the camera portion 10 can be confirmed on the side of the body portion 40.

Further, in the first embodiment, a variety of pieces of information such as control information and state information are bidirectionally transmitted between the camera portion 10 and the body portion 40, which are separate units, so that the camera portion 10 can be remotely controlled from on the side of the body portion 40. For example, a zooming operation, a focusing operation, a shutter speed, an aperture value of the image pickup portion 12, a white balance adjustment in the camera signal processing circuit 16, etc., can be remotely controlled from on the side of the body portion 40.

Figure 5:
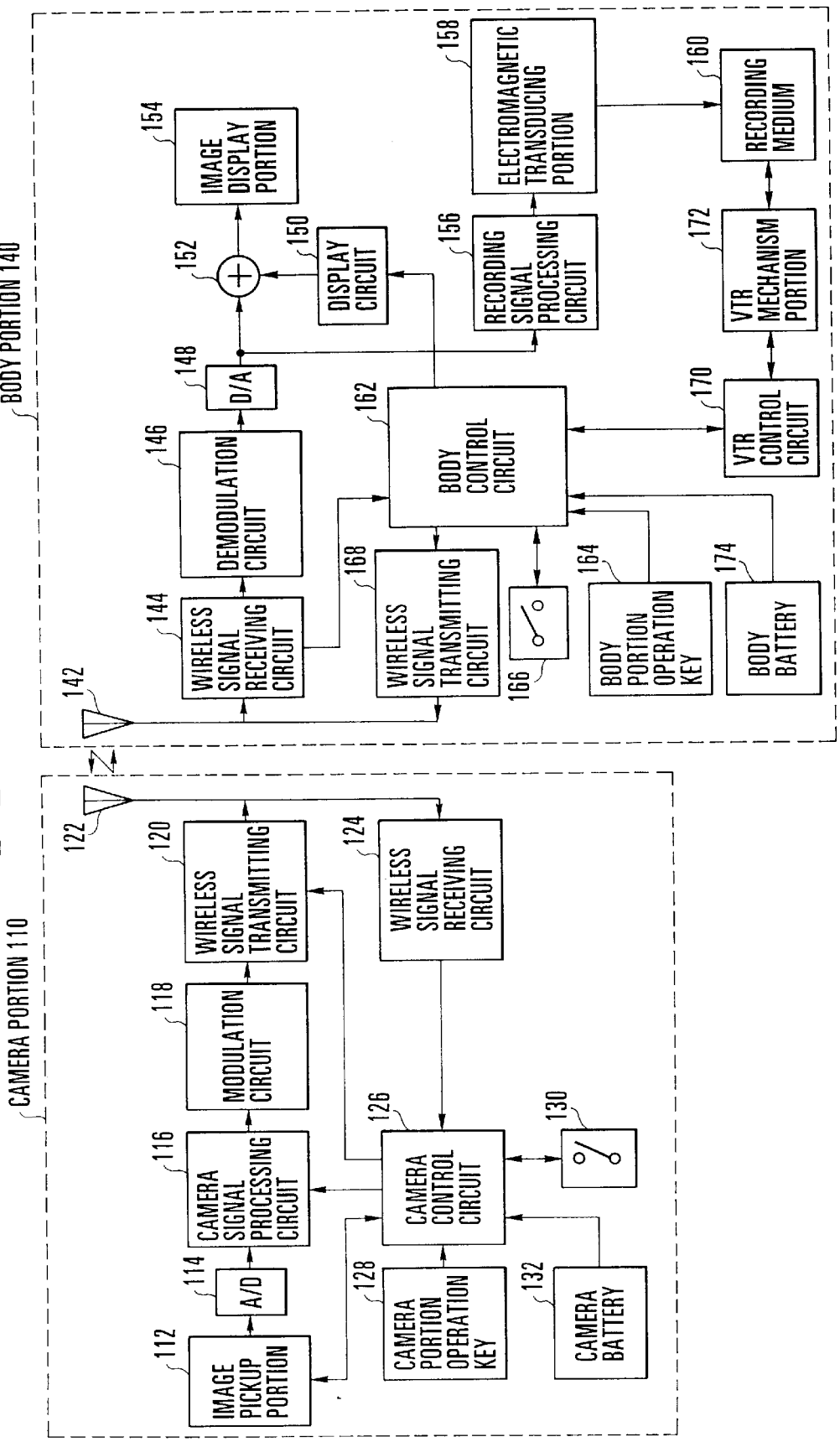
FIG. 5 is a schematic block diagram showing the arrangement of a second embodiment of the present invention.

FIG. 5 is a schematic block diagram showing a second embodiment of the present invention. In FIG. 5, elements 110 to 174 respectively correspond to elements 10 to 74 in the first embodiment shown in FIG. 1. Therefore, the detailed description of each of the elements shown in FIG. 5 is omitted herein.

Figure 6:
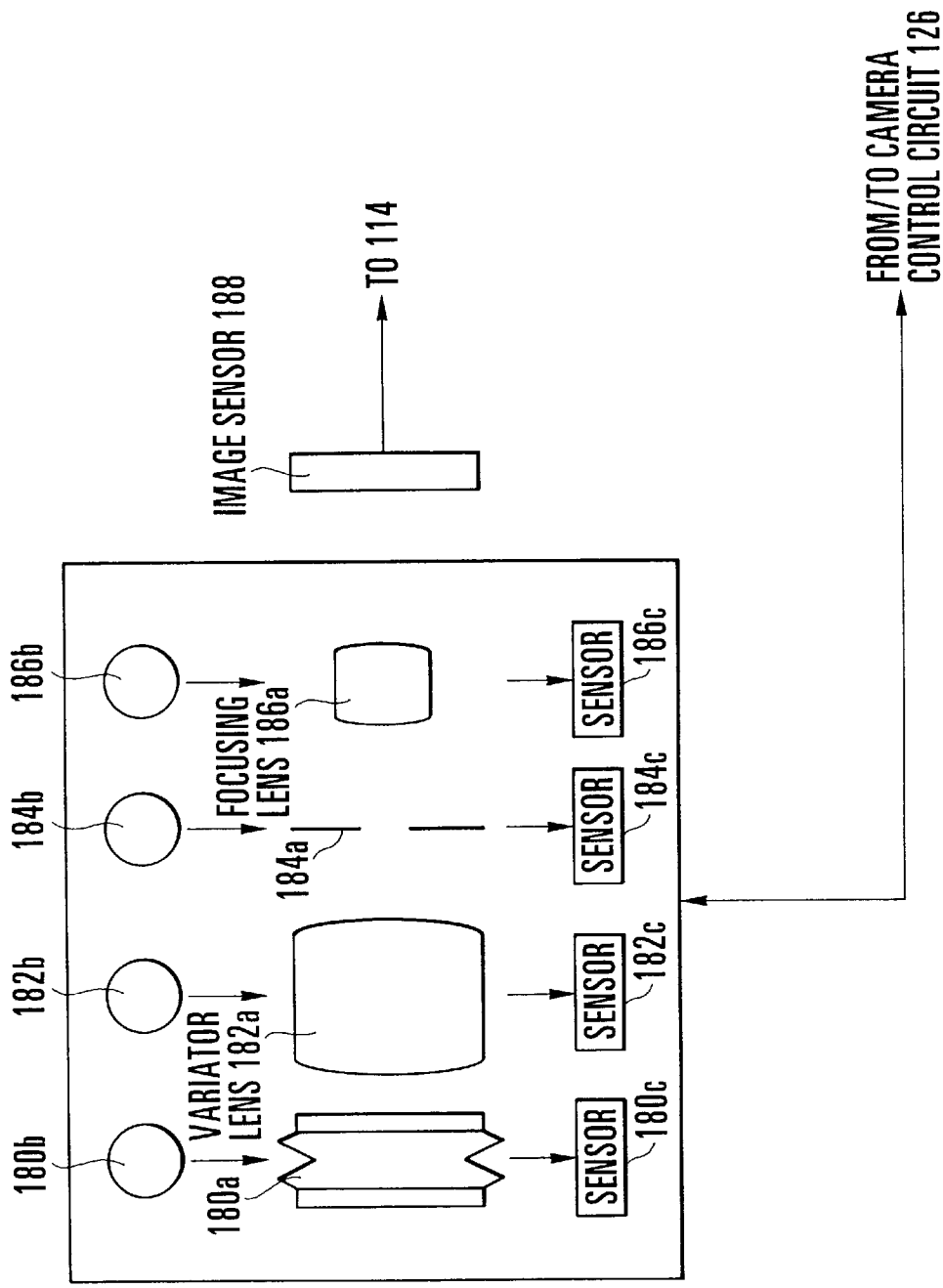
FIG. 6 is a schematic block diagram showing the arrangement of an image pickup portion 112 in the second embodiment shown in FIG. 5.

In the first embodiment described before, while the camera portion 10 can be remotely controlled from on the side of the body portion 40, the current photographing state of the camera portion 10 (for example, a zooming value, an aperture value, etc.) cannot be confirmed from on the side of the body portion 40. On the other hand, in the second embodiment of the present invention, the above point is improved, that is, the current photographing state of a camera portion 110 can be confirmed from on the side of a body portion 140. Accordingly, in the second embodiment, in order to enable the current state of the camera portion 110 to be confirmed on the side of body portion 140, there are provided, inside an image pickup portion 112, a variety of sensors as shown in FIG. 6, and the outputs of the sensors are supplied to a camera control circuit 126. The camera control circuit 126 is capable of detecting the outputs of the sensors disposed inside the image pickup portion 112, if necessary, and is capable of detecting information on the photographing state of the image pickup portion 112 on the basis of the outputs of the sensors. The camera portion 110 outputs to a wireless signal transmitting circuit 120 the information on the photographing state detected by the camera control circuit 126, and wireless-transmits that information via an antenna 122.

With the second embodiment configured as described above, in response to the request wireless-transmitted from the body portion 140 for obtaining the photographing state of the camera portion 110, the camera portion 110 can transmit to the body portion 140 a signal indicative of the photographing state of the camera portion 110. Further, in the body portion 140, the received signal indicative of the photographing state of the camera portion 110 is supplied to a display circuit 150 to generate a character or image signal corresponding to that signal, and the character or image signal is displayed on the screen of an image display portion 154.

FIG. 6 is a schematic block diagram showing the arrangement of the image pickup portion 112. The image pickup portion 112 includes an image stabilizing optical element 180a, an actuator 180b for driving the image stabilizing optical element 180a, an image stabilizing information sensor 180c for detecting the image stabilizing optical element 180a and indicating the operating state of the image stabilizing optical element 180a, a variator lens 182a for varying the focal length, an actuator 182b for driving the variator lens 182a, a sensor 182c for detecting the position of the variator lens 182a to output a zooming value, an iris 184a for controlling an exposure, an actuator 184b for driving the iris 184a, a sensor 184c for detecting the position of the iris 184a to output an iris value, a focusing lens 186a for adjusting focus, an actuator 186b for driving the focusing lens 186a, a sensor 186c for detecting the position of the focusing lens 186a to output a value indicative of a focusing distance, and an image sensor 188 for converting into an electrical signal an optical image formed by the above optical elements. The actuators 180b, 182b, 184b and 186b are controlled by the camera control circuit 126, and the outputs of the sensors 180c, 182c, 184c and 186c are supplied to the camera control circuit 126.

Figure 7:
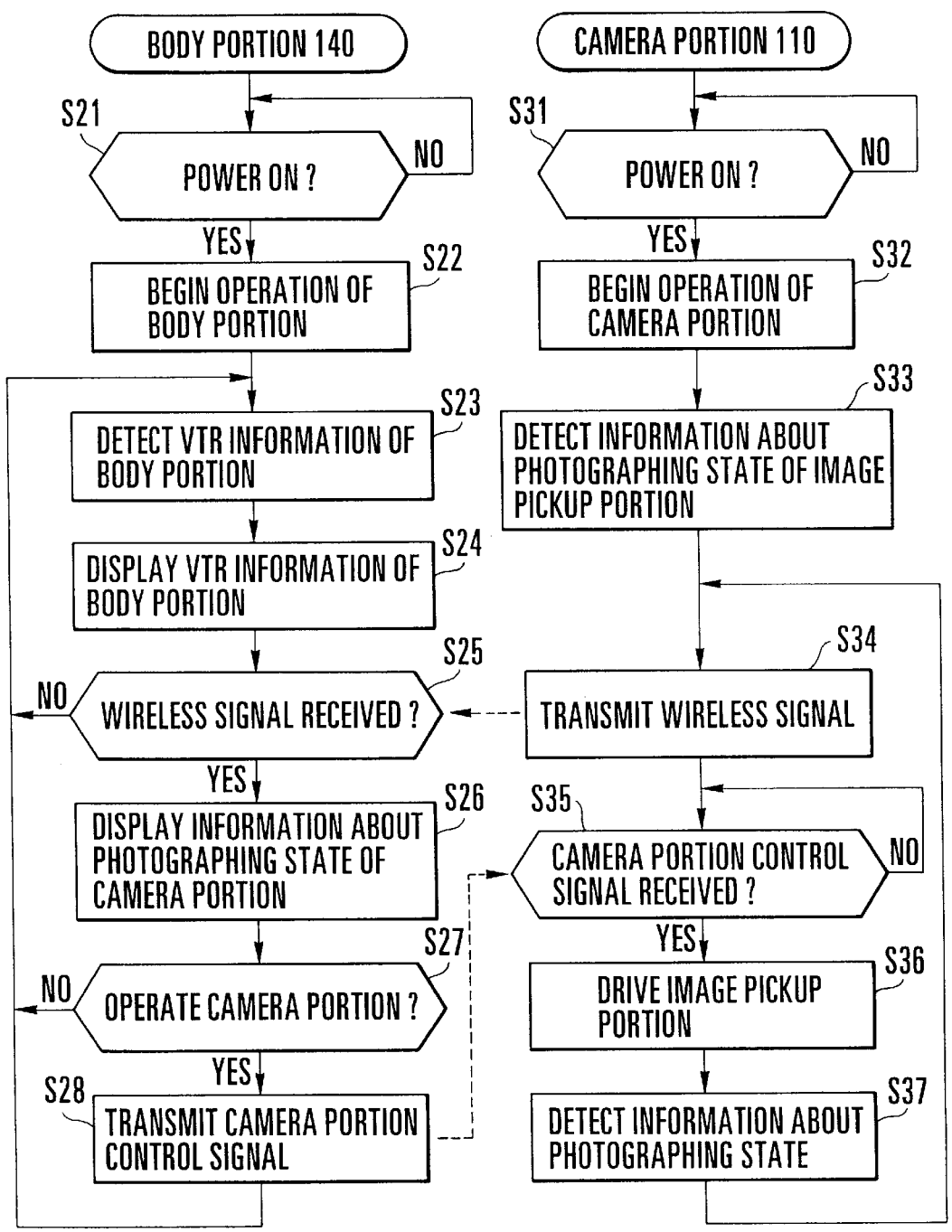
FIG. 7 is a flow chart showing an action of providing a display of the photographing state of a camera portion 110 in the second embodiment shown in FIG. 5.
Figure 8:
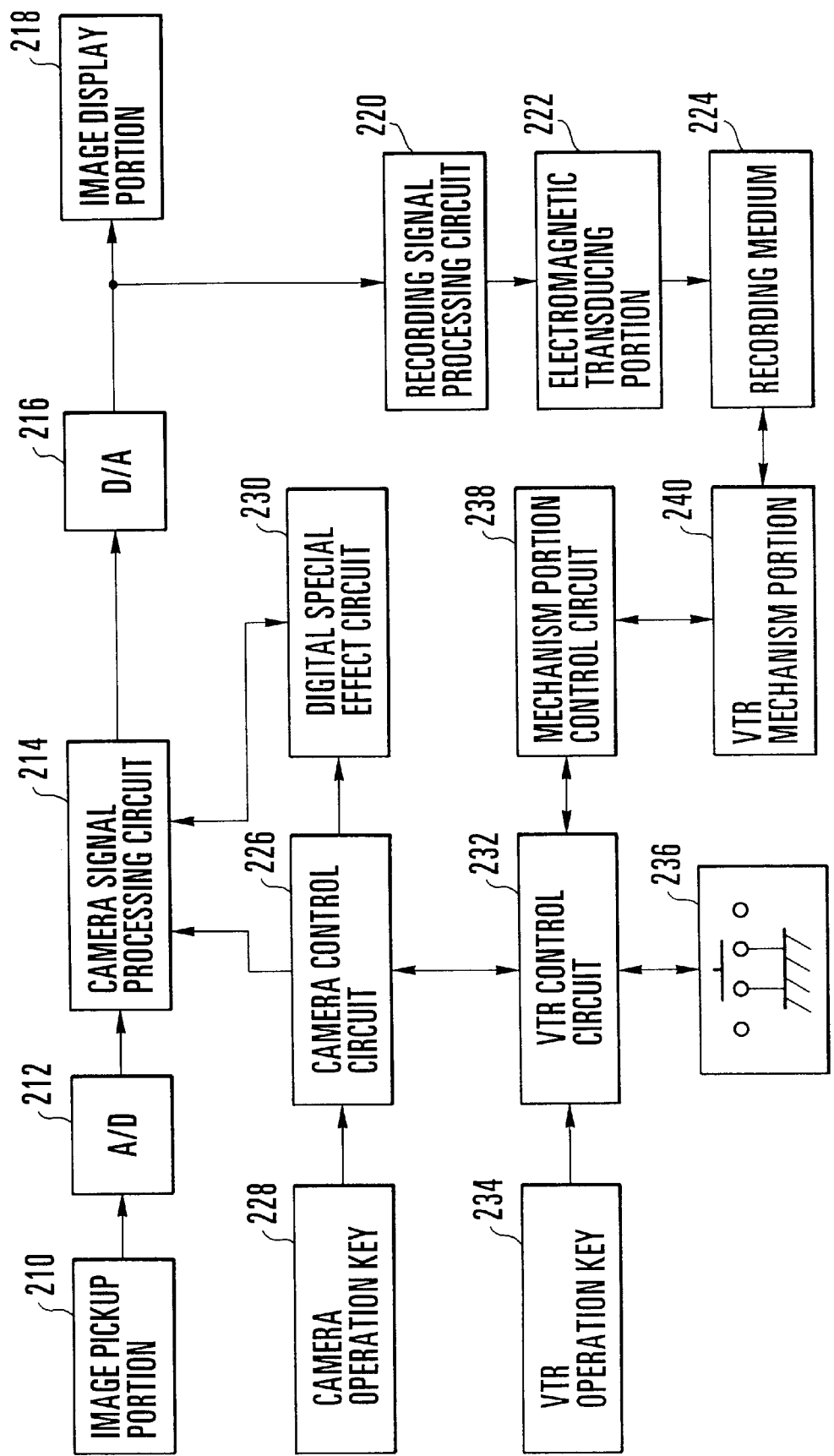
FIG. 8 is a schematic block diagram showing the arrangement of a conventional camera-integrated type image pickup apparatus.

FIG. 7 is a flow chart showing an action of transferring the photographing state of the camera portion 110 to the body portion 140 and displaying that information at the body portion 140.

When a power supply switch 166 is turned on (step S21), the body portion 140 begins to operate (step S22). A body control circuit 162 inquires of a VTR control circuit 170 VTR information (for example, information on operation modes such as fast feeding, rewinding, recording and reproduction, etc., and information on an abnormal state such as the breakage of a magnetic head and the dew condensation of a drum portion) (step S23), and causes the display circuit 150 to display the VTR information on the screen of the image display portion 154 (step S24).

On the side of the camera portion 110, when a power supply switch 130 is turned on (step S31), electric power is supplied to each part of the camera portion 110, so that the camera portion 110 begins to operate (step S32). The camera control circuit 126 detects information concerning the photographing state of the image pickup portion 112 (image stabilizing information, a zooming value, an iris value, a focusing distance or the like) (step S33), and wireless-transmits a signal indicative of the photographing state to the body portion 140 via the wireless signal transmitting circuit 120 and the antenna 122 (step S34). The body portion 140, when receiving from the camera portion 110 the information on the photographing state (step S25), causes the information on the photographing state to be converted into a character or image signal indicative of the photographing state at the display circuit 150, to be superimposed on the picked-up image at an adder 152, and to be displayed on the screen of the image display portion 154 (step S26).

When the operator operates a zooming function of the camera portion 110 by a body portion operation key 164 and the body control circuit 162 detects that operation (step S27), the body control circuit 162 forms a camera portion control signal corresponding to that operation and wireless-transmits the camera portion control signal to the camera portion 110 (step S28). When receiving the camera portion control signal from the body portion 140 (step S35), the camera control circuit 126 controls the actuators 180b to 186b of the image pickup portion 112 corresponding to the camera portion control signal to drive the optical elements 180a to 186a (step S36). Further, the camera control circuit 126 takes in the outputs of the sensors 180c to 186c arranged to detect the respective positions of the optical elements 180a to 186a, forms information on the photographing state and wireless-transmits the information on the photographing state to the body portion 140 if necessary (step S37). The body portion 140 causes a signal indicative of the photographing state from the camera portion 110 to be displayed on the screen of the image display portion 154 in such a state as to be superimposed on the picked-up image, as mentioned in the foregoing.

As described above, in the second embodiment shown in FIG. 5, since information indicative of the photographing state of the camera portion 110 can be confirmed on the side of the body portion 140, the operator can confirm, for example, the position on which the lens of the camera portion 110 is focused, a zooming value (focal length), or the like, at a place where the body portion 140 is situated. In other words, since information concerning the camera portion 110 is displayed at the body portion 140, the operator can confirm the operating state of the camera portion 110 while viewing the picked-up image.

As is understandable from the foregoing description, according to the embodiments of the present invention, since there is no limitation to the positional relationship between the body portion having a display or recording portion and the camera portion, photographing at a cramped place or photographing at a high or low angle becomes easy, so that there is no limitation to a photographing range or a photographing object. Further, since information on a remaining amount of battery energy of the camera portion, which is separated from the body portion, is wireless-transmitted to the body portion and the remaining amount of battery energy of the camera portion can be confirmed on the side of the body portion, it is possible to prevent in advance such a situation that photographing suddenly becomes impossible due to the consumption of the battery of the camera portion. Further, besides the remaining amount of battery energy of the camera portion, a variety of pieces of information about the camera portion are wireless-transmitted to the body portion and are displayed on a screen at the body portion, so that the state of the camera portion can be confirmed on the side of the body portion.

Further, a variety of pieces of information such as control information and state information are bidirectionally transmitted between the camera portion and the body portion, which are separate units, so that the camera portion can be remotely controlled from a the side of the body portion. For example, a zooming operation, a focusing operation, a shutter speed, an aperture value, a white balance adjustment, etc., can be remotely controlled from on the side of the body portion.

Further, since information about the camera portion, such as the photographing state thereof, is transmitted to the body portion, the operator can confirm, for example, the position on which the lens of the camera portion is focused, a zooming value (focal length), or the like, at a place where the body portion is situated. In other words, since information concerning the camera portion 110 displayed at the body portion, the operator can confirm the operating state of the camera portion while viewing the picked-up image.

The invention may be embodied in other specific forms without departing from the spirit or essential characteristics thereof.

For example, according to the first embodiment, information on the battery of each of the camera portion 10 and the body portion 40 is displayed at the image display portion 54 of the body portion 40, and according to the second embodiment, information on the photographing state of the camera portion 110 and information on the recording state of the body portion 140 are displayed at the image display portion 154. However, the arrangement may be set to display all the above information.

Further, it is easily practicable that a recording portion, which is otherwise included in the body portion, may be provided as an integral part of the camera portion, and the body portion may contain only a display portion. In this arrangement, the picked-up image obtained by the camera portion is recorded on a recording medium of the recording portion integrally connected to the camera portion, without being wireless-communicated. Further, the body portion can wireless-transmit a control signal for controlling the action of the recording portion, and the operating conditions of the camera portion and the recording portion can be confirmed at the image display portion of the body portion.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

I claim:

1. An image pickup apparatus which enables wireless communication with a remote display device in a bilateral direction, comprising:

image pickup means for picking up an image, control means for controlling the image pickup means, detecting means for detecting a state of a battery of the image pickup apparatus, and transmitting means for transmitting battery information detected by the detecting means to the display device, wherein intervals for transmitting battery information vary depending on a detection result of the detecting means.

2. An apparatus according to claim 1, wherein the transmitting means transmits the image to the display device.

3. An apparatus according to claim 1, wherein the detecting means detects remaining capacity of the battery.

4. An apparatus according to claim 1, wherein intervals for transmitting the battery information vary depending on remaining capacity of the battery.

5. An apparatus according to claim 4, wherein the intervals for transmitting the battery information are shorter as the remaining capacity of the battery decreases.

6. An apparatus according to claim 1, wherein the detecting means varies intervals for detecting the state of the battery according to remaining capacity of the battery.

7. An apparatus according to claim 1, wherein the control means controls the image pickup means according to a control signal transmitted from the display device.

8. An apparatus according to claim 7, wherein the control means controls at least one of iris, zooming, focusing distance and shake preventing optical element.

9. An apparatus according to claim 1, wherein the transmitting means is capable of transmitting the image and the battery information in a superimposed form.

10. A display apparatus which enables wireless communication with a remote image pickup device in a bilateral direction, comprising:

control means for remote controlling the image pickup device, means for receiving battery information transmitted from the image pickup device, with intervals of transmitting the battery information varying according to a state of a battery of the image pickup device, and display means for displaying the battery information.

11. An apparatus according to claim 10, wherein the battery information receiving means receives image information transmitted from the image pickup device.

12. An apparatus according to claim 10, wherein the battery information indicates a remaining capacity of the battery of the image pickup device.

13. An apparatus according to claim 10, wherein the interval of transmitting the battery information is shorter as the remaining capacity of the battery decreases.

14. An apparatus according to claim 10, wherein the display means displays the battery information and the image transmitted from the image pickup device in a superimposed form.

15. An apparatus according to claim 10, wherein the control means is capable of observing an operation state of the image pickup device.

16. An apparatus according to claim 10, wherein the control means generates a control signal for remote operating the image pickup device.

17. An apparatus according to claim 16, wherein the control signal controls at least one of iris, zooming, focusing distance and shake preventing optical element.

18. A method for controlling an image pickup apparatus which enables wireless communication with a remote display device in a bilateral direction, comprising steps of:

step for picking up an image;

step for controlling the image pickup apparatus;

detecting step for detecting a state of a battery of the image pickup apparatus; and step for transmitting battery information detected by the detecting step to the display device, wherein intervals for transmitting battery information vary depending on a detection result of the detecting step.

19. A method according to claim 18, wherein the image pickup apparatus controls at least one of iris, zoom, in-focus length, and shake-preventing optical element according to a control signal from the display device.

20. A method according to claim 18, wherein the battery information is transmitted with the image.

21. A method for controlling a display apparatus which enables wireless communication with a remote image pickup device in a bilateral direction, comprising steps of:

step for remote controlling the image pickup device;

step for receiving battery information transmitted from the image pickup device with intervals of transmitting the battery information varying according to a state of a battery of the image pickup device; and step for displaying the battery information.

22. A method according to claim 21, wherein the display apparatus is capable to control at least one of iris, zoom, in-focus distance, and shake-preventing optical element of the image pickup device.

23. A method according to claim 21, wherein the battery information is received with the image.

24. An image pickup apparatus which enables wireless communication with a remote external device in a bilateral direction, comprising:

detecting means for detecting a state of a battery of the image pickup apparatus;

transmitting means for transmitting battery information detected by the detecting means to the external device; and control means for controlling function to transmit the battery information according to the state of the battery, and function to transmit the battery information according to control signal from the external device.

25. An apparatus according to claim 24, wherein the image pickup apparatus controls at least one of iris, zoom, in-focus length and shake-preventing optical element according to the control signal from the external device.

26. An apparatus according to claim 24, wherein the battery information is transmitted with the image.

27. A method for controlling an image pickup apparatus which enables wireless communication with a remote external device in a bilateral direction, comprising:

step for detecting a state of a battery of the image pickup apparatus;

step for transmitting battery information detected in said detecting step to the external device; and step for controlling function to transmit the battery information according to the state of the battery, and function to transmit the battery information according to control signal from the external device.

28. A method according to claim 27, wherein the image pickup apparatus controls at least one of iris, zoom, in-focus length and shake-preventing optical element according to the control signal from the external device.

29. A method according to claim 27, wherein the battery information is transmitted with the image.

30. A display apparatus which enables wireless communication with a remote external device in a bilateral direction, comprising:

control means for controlling function to receive battery information transmitted according to a state of a battery of the external device and function to receive the battery information transmitted according to a control signal transmitted to the external device; and display means for displaying the battery information.

31. An apparatus according to claim 30, wherein the display apparatus is able to control at least one of iris, zoom, in-focus length, and shake-preventing optical element of the external device.

32. An apparatus according to claim 30, wherein the battery information is transmitted with image signal.

33. A method for controlling a display apparatus which enables wireless communication with a remote external device in a bilateral direction, comprising:

step for controlling function to receive battery information transmitted according to a state of a battery of the external device and function to receive the battery information transmitted according to a control signal transmitted to the external device; and step for displaying the battery information.

34. A method according to claim 33, wherein the display apparatus is able to control at least one of iris, zoom, in-focus length, and shake-preventing optical element of the external device.

35. A method according to claim 33, wherein the battery information is transmitted with image signal.

* * * * *

UNITED STATES PATENT AND TRADEMARK OFFICE
CERTIFICATE OF CORRECTION

PATENT NO. : 6,052,509
DATED : April 18, 2000
INVENTOR(S) : Abe Takeshi

It is certified that error appears in the above-identified patent and that said Letters Patent are hereby corrected as shown below:

Col. 10, line 43, delete "a".

Signed and Sealed this

Fifteenth Day of May, 2001

Attest:

NICHOLAS P. GODICI

Attesting Officer

Acting Director of the United States Patent and Trademark Office